United States Patent [19]

Tjon-Joe-Pin et al.

[11] Patent Number: 5,247,995
[45] Date of Patent: Sep. 28, 1993

[54] METHOD OF DISSOLVING ORGANIC FILTER CAKE OBTAINED FROM POLYSACCHARIDE BASED FLUIDS USED IN PRODUCTION OPERATIONS AND COMPLETIONS OF OIL AND GAS WELLS

[75] Inventors: Robert M. Tjon-Joe-Pin, Houston; Harold D. Brannon, Spring; Allan R. Rickards, Pinehurst, all of Tex.

[73] Assignee: BJ Services Company, Houston, Tex.

[21] Appl. No.: 910,050

[22] Filed: Jul. 8, 1992

Related U.S. Application Data

[63] Continuation-in-part of Ser. No. 842,038, Feb. 26, 1992, Pat. No. 5,201,370, and a continuation-in-part of Ser. No. 842,041, Feb. 26, 1992, Pat. No. 5,224,544.

[51] Int. Cl.$^5$ .................... E21B 37/08; E21B 43/25
[52] U.S. Cl. .................... 166/312; 166/300; 252/8.552
[58] Field of Search .................... 166/300, 305.1, 312; 252/8.551, 8.552

[56] References Cited

U.S. PATENT DOCUMENTS

| | | | |
|---|---|---|---|
| 2,602,778 | 7/1952 | Snyder | 166/312 X |
| 2,681,704 | 6/1954 | Menaul | 166/283 X |
| 3,044,550 | 7/1962 | Ellers | |
| 3,684,710 | 8/1972 | Cayle et al. | 252/8.551 |
| 4,160,483 | 7/1979 | Thomas et al. | 166/307 |
| 4,342,866 | 8/1982 | Kang et al. | 536/119 |
| 4,343,363 | 8/1982 | Norton et al. | 166/281 |
| 4,410,625 | 10/1983 | Cadmus | 435/42 |
| 4,479,543 | 10/1984 | Kalfayan et al. | 166/300 |
| 4,609,475 | 9/1986 | Hanlon et al. | 252/8.552 |
| 4,690,891 | 9/1987 | Hou et al. | 435/42 |
| 4,713,449 | 12/1987 | Vanderslice et al. | 252/8.551 X |
| 4,809,783 | 3/1989 | Hollenbeck et al. | 166/307 |
| 4,886,746 | 12/1989 | Cadmus et al. | 435/42 |
| 4,996,153 | 2/1991 | Cadmus et al. | 435/209 |
| 5,032,297 | 7/1991 | Williamson et al. | 166/305.1 X |
| 5,067,566 | 11/1991 | Dawson | 166/308 |
| 5,165,477 | 11/1992 | Shell et al. | 166/300 X |

FOREIGN PATENT DOCUMENTS 0030393 6/1981 European Pat. Off.

OTHER PUBLICATIONS

M. E. Slodki and M. C. Cadmus, "Production and Stability of Xanthan Gums; Xanthanases and Their Applicability", *Microbes and Oil Recovery*, vol. 1, 1985, pp. 190-199.

M. C. Cadmus and M. E. Slodki, "Enzyme Breakage of Xanthan Gum Solution Viscosity in the Presence of Salts", *Developments in Industrial Microbiology*, 1985, Chap. 18.

M. C. Cadmus and M. E. Slodki, "Bacterial Degradation of Xanthan Gum", *Industrial Polysaccharides: Genetic Engineering, Structure/Property Relations and, Applications*, 1987, pp. 101-107.

*Primary Examiner*—George A. Suchfield
*Attorney, Agent, or Firm*—Charles D. Gunter, Jr.; Susan L. Firestone

[57] ABSTRACT

The invention shows a method of degrading damaging material within a subterranean formation of a well bore using an enzyme treatment. Filter cakes and very viscous fluids are such damaging materials. The enzyme treatment degrades polysaccharide-containing filter cakes and damaging fluids which reduces their viscosity. The degraded filter cake and damaging fluid can then be removed from the formation back to the well surface. The particular enzymes utilized are specific to a particular type of polysaccharide and are active at low to moderate temperatures. The enzymes attack only specific linkages in filter cakes and damaging fluids and are active in the pH range of about 2.0 to 10.0.

35 Claims, No Drawings

METHOD OF DISSOLVING ORGANIC FILTER CAKE OBTAINED FROM POLYSACCHARIDE BASED FLUIDS USED IN PRODUCTION OPERATIONS AND COMPLETIONS OF OIL AND GAS WELLS

This is a continuation-in-part of the copending applications Ser. No. 09/842,038, U.S. Pat. No. 5,201,870 filed Feb. 26, 1992, and Ser. No. 07/847,041, U.S. Pat. No. 5,224,544 filed Feb. 26, 1992.

BACKGROUND OF THE INVENTION

1. Field of the Invention

The present invention relates to filter cakes of the type formed during well bore operations and particularly to a method for increasing the permeability of the formation through the use of an enzyme treatment to break down a polysaccharide-containing filter cake.

2 Description of the Prior Art

Filter cakes or face plugs form during various procedures done within a well bore. Filter cakes are composed of precipitates, such as silicates formed from drilling muds, or residue formed after using polymer-containing gelatable fluids. The residue can contain either polyacrylamide or polysaccharides, depending on the polymer used. The method of the invention relates to polysaccharide residues, particularly filter cakes.

During hydraulic fracturing, one type of well bore procedure, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gelation of suitable polymers, such as a suitable polysaccharide, and are known as fracturing gels. The gelled fluid can be accompanied by a propping agent which results in the placement of the propping agent within the fracture thus produced. The proppant remains in the produced fracture to prevent the complete closure of the fracture and to form a conductive channel extending from the well bore into the formation being treated once the fracturing fluid is recovered. Propping agents include a wide variety of material and may be coated with resins. The gel fluids may also contain other conventional additives common to the well service industry such as surfactants, and the like.

Occasionally, production from well bore operations must cease temporarily to perform auxiliary procedures called workover operations. The use of temporary blocking gels, also formed by gelation of appropriate polysaccharides, produces a relatively impermeable barrier across the production formation.

At the end of fracturing or workover operations the gels are degraded and the fluids are recovered. The recovery of fracturing and blocking gel fluids is accomplished by reducing the viscosity of the fluid to a low value such that it flows naturally from the formation under the influence of formation fluids and pressure. This viscosity reduction or conversion is referred to as "breaking."

Polysaccharides have other uses within the oil industry. For example, polysaccharides thicken fluids and control fluid loss. Other types of polysaccharides are used with proppants, such as sand control fluids and completion fluids Filter cakes, however, often form during these procedures. A filter cake is a tough, dense, practically water insoluble residue that reduces the permeability of the formation. The concentration of polysaccharide within a filter cake is greater than the normal polysaccharide concentration in a fracturing fluid, for instance, 480 pounds per thousand (ppt) versus 40 ppt. See, S.P.E. Publication No. 21497.

Filter cakes form in a variety of ways. For example, when the gel fluids are pumped into the subterranean formation, fluid may leak into the formation matrix through the pore spaces of the rock. The pores act as filters, permitting the fluid to leak into the rock matrix while filtering out the gel. A layer of the filtered gel deposits on the face of the matrix and plugs the formation. Incomplete gel degradation is another example.

Filter cake interferes with production from the formation by decreasing the output of hydrocarbons. Filter cake fills the rock matrix pores and curtails the flow of fluids from the matrix. When a fracture closes at the end of treatment, the closure may force the remaining filter cake into the proppant bed and nearby flow channels. The filter cake can then plug the flow channels, thereby reducing the flow of hydrocarbons during production.

Although some polysaccharides do not form filter cakes, the viscosity of these fluids creates damaging conditions analogous to those found with filter cakes. Therefore, the term "filter cake" when used as a generic term in this disclosure may also refer to these conditions.

The permeability of the formation may be assessed in the laboratory. One procedure of assessing the permeability measures the flow of a fluid through a damaged formation sample at a given rate and pressure. For example, a completely broken filter cake regains greater than about 95% of the initial permeability of a formation sample using a damage permeability test, while a plugged formation has about 30% of the initial permeability, depending on the fluid, core and conditions. A second procedure assesses the retained conductivity of the formation. A plugged formation has a retained conductivity of less than 10%, depending on the conditions.

Therefore, removal of filter cake is necessary to increase the flow of production fluids from the formation. Since filter cake is dense and practically insoluble in aqueous fluids, it cannot be merely flushed out of the formation. Removal of filter cake requires some additional treatment. Common oxidants, for example persulfates, are often used to remove filter cake. The oxidants, however, are ineffective at low temperature ranges from ambient temperature to 130° F. In this temperature range the oxidants are stable and do not readily undergo homolytic cleavage to initiate the degradation of the filter cake. Cleavage is typically achieved at lower temperatures only by using high concentrations of oxidizers. High oxidizer concentrations are frequently poorly soluble under the treatment conditions.

Reactions with common oxidants, however, are difficult to control. Common oxidants break polysaccharides into nonspecific units, creating a filter cake consisting of a mixture of monosaccharide, disaccharide and polysaccharide fragments as well as other miscellaneous fragments. Common oxidants react with things other than the gel fragments. Oxidants can react with iron found in the formation, producing iron oxides which precipitate and damage the formation, thereby decreasing permeability. Oxidants can also react nonspecifically with other materials used in the oil industry, for example, tubings, linings and resin coated proppants.

Oxidants can break down any subsequent gels used in the formation. If the oxidants are not completely removed or inactivated, they can prematurely break the new gel. Therefore, oxidants must be completely removed or inactivated before any subsequent introduction of another gel into the subterranean formation.

To completely remove the filter cake after treating with oxidants, additional treatment may be required. An extra acid hydrolysis step may be necessary to remove residual residue. Treatment with an acid for example, hydrochloric acid, augments the removal of excess residue. Acid treatments, however, corrode steel and equipment used in the operation. Acid treatments may also be incompatible with the formation and/or its fluids.

Fluoride ions paired with an oxidant in an acidic environment increases the efficiency of filter cake removal. Free fluoride ions compete with the polysaccharide polymer for the metal ions of the crosslinker. The crosslinker metal ions have a greater affinity for fluoride than for the polysaccharide in the gel. This affinity paired with the action of an oxidizer breaks the gel more quickly.

One of the problems associated with fluoride is that the free ions are extremely reactive. Unfortunately, fluoride can react with most metals and many nonmetals. Free fluoride ions can react with the metals in the tubing and the formation. For example, fluoride ions readily react with calcium, forming calcium fluoride which precipitates in aqueous solutions and damages the production zone.

To circumvent the problem of the reactivity of fluoride ions, the prior art suggests the addition of boron which has a high affinity for fluoride. Yet, no amount of added boron can counteract the amount of calcium present in many formations, such as limestone which is calcium carbonate. Calcium carbonate is insoluble in water and soluble in acid solutions whereas calcium fluoride is only slightly soluble in water and acid solutions. These conditions favor the formation of calcium fluoride. To prevent the formation of calcium fluoride in a limestone formation, at a minimum the boron would have to be in excess of the fluoride, hence interfering with the efficiency of the reaction by reducing the amount of fluoride available to react with the crosslinker of the filter cake.

Enzyme systems are known to degrade the types of polysaccharides used in fracturing, blocking gels and other oil industry applications. Enzyme breaker systems have been designed to break gelled fracturing and blocking fluids used in the industry. See, for example, the pending applications of Robert Tjon-Joe-Pin entitled "Enzyme Breaker For Galactomann, an Based Fracturing Fluid", U.S. Pat. No. 5,201,370, and Robert Tjon-Joe-Pin, et al., "Novel Enzyme Complex Used For Breaking Crosslinked Cellulose Based Blocking Gels At Low To Moderate Temperatures", U.S. Pat. No. 5,224,544. Enzymes, for example the cellulases, hemi-cellulases, amylases, pectinases, and their mixtures are familiar to those in the well service industry when used in fracturing gel breaker systems. Some of these enzymes break the bonds that connect the monosaccharides into a polysaccharide backbone, for instance, the (1,4)-α-D-galactosiduronic linkages in pectin. These conventional enzymes are nonspecific mixtures that cause random breaks. Therefore using these conventional enzymes to break gelled fracturing fluids results in only a partial degradation of the polysaccharide polymer. Instead of fragmenting almost completely into much smaller fragments, these enzymes break the polysaccharide backbone into a mixture of fragments consisting of monosaccharides, disaccharides and polysaccharides. Larger crosslinked fragments like disaccharides and polysaccharides can form filter cakes and damage the production zone. Since the breaks are nonspecific, conventional enzymes can degrade other components used in the system.

The present invention has as its object to provide a mechanism for degrading a filter cake formed during fracturing and other well bore operations which produces a rapid degradation of the filter cake to allow increased permeability of the formation and enhanced recovery of the formation fluids.

Another object of the invention is to provide a system for degrading a filter cake at low to moderate temperatures.

Another object of the invention is to provide an enzyme system that degrades the crosslinked residue of the filter cake primarily into monosaccharide fragments.

Another object of the invention is to provide an enzyme system that reduces the viscosity of noncrosslinked polysaccharides by degrading the polysaccharides into smaller pieces.

Another object of the invention is to provide a mechanism for degrading filter cake that does not react with other materials or metals used in well bore operations or found within the subterranean formation.

SUMMARY OF THE INVENTION

In the method of the invention, a polysaccharide-containing filter cake is removed from within a subterranean formation surrounding a well bore. The method consists of pumping an enzyme treatment to a desired location within the well bore. The enzyme treatment degrades the polysaccharide-containing filter cake, removing the filter cake from the formation, and increasing the permeability of the formation.

Preferably, the enzyme treatment consists of hydrolases that are specific to the linkages within the polysaccharide-containing filter cake. The type of enzymes used depends on the type of polysaccharide contained in the filter cake. Most preferably, the polysaccharides contained in the filter cake consists of guars, derivatized guars, celluloses, derivatized celluloses, starches, derivatized starches or xanthan gums.

In a particularly preferred method for practicing the invention, the filter cake contains polysaccharides with repeating units of mannose and galactose, repeating units of glucose, or repeating units of glucose with alternating trisaccharide sidechains. The conditions for the enzymic degradation are tailored to the type of polysaccharide and enzymes selected. Generally, the pH of the enzyme treatment is between about 2.0 to 10.0. The temperatures generally range from about 50° F. to 195° F. Most preferably the enzyme treatment for a guar based polysaccharide, for example, is at about pH 5.0 with the temperature between about 80° F. and 175° F. The enzyme treatment is pumped to a desired location in the well-bore to coat the filter cake within a production formation. The enzyme treatment reduces the viscosity of the filter cake whereby the degraded filter cake can be pumped from the formation. The removal of filter cake increases the permeability of the formation or the fracture, allowing a greater recovery of formation fluids pumped from the subterranean formation back to the well surface.

Additional objects, features and advantages will be apparent in the written description which follows.

DETAILED DESCRIPTION OF THE INVENTION

The method of the invention breaks up the filter cake formed after using polysaccharide-containing fluids, such as fracturing or blocking gels. The filter cake primarily forms by filtering the aqueous fluid from the hydratable polymer through a rock matrix. However, residual debris also contributes to decreased permeability of the formation. This debris is left-over after incompletely breaking a gel consisting of a hydratable polymer blended into an aqueous fluid. The aqueous fluid could be, for example, water, brine, aqueous based foams or water-alcohol mixtures. The hydratable polymer useful in the present invention can be any of the hydratable polysaccharides familiar to those in the well service industry. These polysaccharides are capable of gelling in the presence of a crosslinking agent to form a gelled based fluid. For instance, suitable hydratable polysaccharides are the galactomannan gums, guars, derivatized guars, cellulose and cellulose derivatives. Specific examples are guar gum, guar gum derivative, locust bean gum, caraya gum, xanthan gum, cellulose, and cellulose derivatives. The preferred gelling agents are guar gum, hydroxypropyl guar, carboxymethyl hydroxypropyl guar, cellulose, carboxymethyl cellulose, carboxymethyl hydroxyethyl cellulose and hydroxyethyl cellulose. The most preferred gelling agents are guar gum, hydroxypropyl guar, carboxymethyl hydroxypropyl guar, hydroxyethyl cellulose and carboxymethyl hydroxyethyl cellulose depending on the type of enzyme treatment selected.

In addition to the hydratable polymer, the filter cake may include the crosslinking agent used in gelation. The crosslinking agent can be any of the conventionally used crosslinking agents which are known to those skilled in the art. For instance, in recent years, gelation of the hydratable polymer has been achieved by crosslinking these polymers with metal ions including aluminum, antimony, zirconium and titanium containing compounds including the so-called organotitinates. See, for instance, U S. Pat. No. 4,514,309. For example, borate crosslinkers are preferred for guar gels while the transition metals are preferred for crosslinking cellulose gels.

The method of the invention reduces the viscosity of other polysaccharides used in the oil industry as well. These polysaccharides are not crosslinked. Polysaccharides, such as starch, thicken fluids or control fluid loss. Starch or derivatized starch, whether water soluble or insoluble, can be used. Xanthan gums are often used as sand control agents. Both starch and xanthan gums contribute to a damaging decrease in permeability of the formation or fracture. Starches may form filter cakes, although starch filter cakes have no crosslinkers present. Xanthan gums do not easily form filter cakes within the formation. Xanthans do, however, decrease the permeability in a manner analagous to a filter cake. Therefore, whenever the term "filter cake" is used generically in this disclosure and claims to describe the method of the invention, the term also encompasses the method of reducing the viscosity of fluids with damaging, viscous, noncrosslinked, polysaccharides such as starches, xanthans and the like.

Filter cake removal methods commonly used in the industry for this particular application include chemical oxidizers, such as persulfates, alone or paired with additives, such as a source of fluoride ions.

The present invention provides a novel treatment for the removal of a polysaccharide-containing filter cake from a formation. The enzyme treatment is a mixture of highly specific enzymes which, for all practical purposes, quickly and completely degrades the polysaccharide residue found within a filter cake. The degraded residue is then flushed from the formation by formation fluids or in the case of a dry gas well, by formation pressure. These enzymes are well adapted for use with a specific type of polysaccharide. The enzyme system selected depends on the type of polysaccharide used for the gel polymer backbone. Because the enzymes are highly specific, they do not react or degrade the materials commonly found within a subterranean formation or used in well bore operations, such as limestone, iron, resin coated proppants, tubings and the like.

The method of the invention for treating guar-containing filter cakes uses enzymes that are hydrolases. The enzyme hydrolases of the invention are stable in the pH range of about 2.0 to 11.0 and remain active at both acid and alkaline pH ranges of about 2.0 to 10.0. These same enzymes are active at low to moderate temperatures of about 50° F. to about 195° F. Preferably, for the method of the invention, the pH range is 3 to 7 at a temperature range of about 80° F. to 195° F., with the most preferred pH of about 5.0. At temperatures of above about 125° F., the preferable pH ranges from about 3 to 5, most preferably at about 5.0.

The enzymes are specific to attack the mannosidic and galactomannosidic linkages in the guar residue, breaking the molecules into monosaccharide and disaccharide fragments. Under some conditions, these enzymes hydrolyze the residue completely into monosaccharide fragments. The preferred enzymes for the guar-containing filter cake are galactomannan hydrolases collectively called galactomannanase and they specifically hydrolyze the (1,6)-α-D-galactomannosidic and the (1,4)-β-D-mannosidic linkages between the monosaccharide units in the guar-containing filter cake respectively. The preferred galactomannanase is commercially available from Novo Nordisk of Norway as "Gammanase 1.5 L." The preferred concentration of galactomannanase is a 1.2 (w/w) solution of (1,6)-α-D-galactosidase and mannan endo-(1,4)-β-D-mannosidase, the galactomannanase being present in the range from about 0.1% to 0.4% (v/v) based on the total volume of the aqueous fluid.

The method of the invention for removing cellulose-containing filter cakes uses hydrolase enzymes which differ from the enzymes for the guar-containing filter cake. These enzymes are active in the pH range of about 1.0 to 8.0. The preferred pH range is about 3.0 to 5.0. These same enzymes are active at low to moderate temperatures of about 50° F. to 140° F. Most preferably for the method of the invention, the pH is about 3.5 to 4.0.

With a cellulose or derivatized cellulose containing filter cake, the specific enzymes attack the glucosidic linkages of the cellulose backbone, breaking the backbone into fragments. Cellulose is composed of repeating units of D-glucose joined by (1,4)-β-glucosidic linkages. The fragments are broken down into the D-glucose monosaccharides. The preferred enzymes are any enzymes or combination of enzymes that attack the glucosidic linkages of the cellulose polymer backbone and degrade the polymer into mostly monosaccharide units, such as cellulase, nonspecific hemicellulases, glucosidase, endoxylanase, exo-xylanase and the like. The two preferred enzymes are commonly called exo and endo xylanases. The preferred enzymes for this cellulose based system specifically hydrolyze the exo(1,4)-$\beta$-D-glucosidic and the endo(1,4)-$\beta$-D-glucosidic linkages between the monosaccharide units in the cellulose backbone and the 1,4)-$\beta$-D-glucosidic linkage of any cellobiose fragments. The preferred xylanases are commercially available from Novo Nordisk of Norway as "SP-431". The preferred enzyme mixture is in a 1:4 (w/w) solution of exo(1,4)-$\beta$-D-xylanase and endo(1,4)-$\beta$-D-xylanase. The xylanases should be present in the range from about 0.0i% to about 10.0% by volume, based on the total volume of aqueous fluid, most preferably about 0.5%.

The method of the invention for removing starch derived filter cake, uses enzymes that are specific for the linkages found within the starch molecule. These enzymes are active at the pH range of between about 2.0 to 10.0 for the temperature range of about 50° F. to 230° F.

Starch, like cellulose, is a polysaccharide formed of repeating units of D-glucose. However, the glucose molecules are joined in an (1,4)-$\alpha$-glucosidic linkage rather than the (1,4)-$\beta$-glucosidic linkage found in cellulose. Starch contains a mixture of two polymers, amylose and amylopectin. Amylose consists of a linear chain of D-glucose molecules bound in $\alpha$-D-(1-4) linkages. Amylopectin, the major component of the starch polysaccharide, is a highly branched D-glucan with a backbone of D-glucose $\alpha$-D-(1-4) linkages and D-glucose side chains connected by $\alpha$-D-(1-6) linkages. To reduce the viscosity of starch residue, such as filter cake, the preferred enzymes digest the starch molecules until no starch is present as determined by iodine testing. The enzymes reduce the starch into smaller units, most likely oligosaccharide units and dextrin. This degradation sufficiently decreases the viscosity. The smaller polysaccharides do not damage the formation and often terminally degrade at higher temperatures. These enzymes or combination of enzymes are selected from the endo-amylases, exo-amylases, isoamylases, glucosidases, $\alpha$-glucosidases, glucan (1,4)-$\alpha$-glucosidase, glucan (1,6)-$\alpha$-glucosidase, oligo-(1,6)-$\alpha$-glucosidase, $\alpha$-glucosidase, $\alpha$-dextrin endo-(1,6)-$\alpha$-glucosidase, amylo-(1,6)-glucosidase, glucan (1,4)-$\alpha$-maltotetrahydralase, glucan (1,6)-$\alpha$-isomaltosidase, glucan (1,4)-$\alpha$-maltohexaosidase, and the like. Preferably, the enzymes are endo-amylases. The endo-amylases randomly attack the internal $\alpha$-glucosidic linkages. There is no preferable type of endo-amylase, as the specific endo-amylase selected varies on the conditions present in the formation, such as pH and temperature. The various types of endo-amylases are well known in enzymology and are readily available from a wide variety of commercial vendors, such as Novo Nordisk. The amount of enzyme used in the method is the same as discussed for the cellulose filter cake.

Enzyme treatment for cellulose-containing polysaccharides can be adapted for other polysaccharides with the cellulose backbone and side chains. The treatment may require additional enzymes to break the side chain linkages before effective degradation of the backbone occurs. These enzymes are hydrolases specific to the linkages of the side chains.

An example of this type of polysaccharide is xanthan. Enzyme treatment specific for the xanthan polysaccharide reduces the static viscosity of the xanthan. The enzyme treatment works at a pH range between about 2.0 and 10.0 at temperatures ranging from about 50° F. to 150° F.

Xanthan gums are cellulose-containing, heteropolysaccharides. Xanthans contain a cellulose backbone of (1,4)-$\beta$-D-glucosidic linkages and trisaccharide side chains on alternate residues. The trisaccharide side chains may consist of glucuronic acid, pyruvated mannose, mannose, and/or acetylated mannose. The method of the invention uses hydrolases which can break down the (1,4)-$\beta$-D-glucosidic linkages within the cellulose backbone. The cellulose backbone, however, can only be broken after treating the xanthan to degrade the trisaccharide side chains with another enzyme such as a mannosidase. The treatment therefore requires at least two enzymes. The enzyme treatment uses the same enzymes described above for cellulose-containing filter cakes and mannosidase or mannan (1,2)-$\beta$-D-mannosidase, although no particular enzymes or concentration of enzymes are currently preferred. The xanthan gum reduces to smaller polysaccharide molecules, probably the smallest is a tetrasaccharide. The degradation decreases the static viscosity of the xanthan polysaccharide for easy removal. Although neutral or slightly acidic pHs are preferred, no pH is currently considered optimal. The pH depends on the activity range of the selected enzymes and the conditions found within the formation.

Applications of the enzyme treatment fluid are pumped through the tubing to the location of the filter cake within the production zone at a rate sufficient to coat the formation. Pumping assures even dispersal of the enzymes for the best results. Additives commonly used in the oil industry, for instance surfactants, chelating agents, foaming agents and the like, may be added to the enzyme treatment. Preferably, the treatment is applied by foaming. Preferably, the filter cake is treated with a minimum volume of aqueous fluid. This minimum volumes equals one fracture pore volume for dense and nonleaking formations, with two pore volumes preferred. Larger volumes of fluid should be used for less dense and/or leaking formations. The pore volume can be measured in any manner currently used in the oil industry.

The enzyme treatment is shut in the formation for a time sufficient to begin degrading the filter cake. The shut in time depends on the temperature and pH of the treatment, since reaction rates vary significantly on these two variables. The quantity of enzyme used can be increased to reduce the time required for degradation without interfering with the enzyme substrate reaction or causing unwanted side effects.

Unexpectedly, the enzyme treatment degrades the guar and cellulose filter cakes into solutions of mostly monosaccharide units. "Mostly monosaccharide units" means that the gel polymer backbone is reduced to a solution of more than about 90% monosaccharide units, preferably more than about 95% monosaccharide units. Adding additional types of enzymes or oxidants to this system, however, substantially decreases the effect of the enzymes of the invention on the polysaccharide residue of the filter cake.

Although the starch and xanthan gum treated formations are not reduced to mostly monosaccharide units, the treatment sufficiently decreases the viscosity to resume adequate flow of formation fluids.

In the method of the invention, the pH of the enzyme fluid is adjusted through the use of a suitable buffer, acid or base, for instance, hydrochloric acid or sodium hydroxide. The optimum pH range is from about 3.0 to 7.0. Preferably, the pH is about 5.0 for the guar based filter cake treatment, 3.5 for the cellulose based filter cake treatment. No specific pH is currently preferred for the starch and xanthan gum treatments.

The following examples are intended to illustrate and not limit the invention:

EXAMPLE 1

The use of a Damage Permeability Test assesses the recovery of permeability of a core after degradation of the blocking gel fluid polymer. For this test, a test core is drilled from a sandstone formation sample. The dimensions of the core are carefully measured. The cross sectional area (A) and the length of the core (L) are recorded.

The core is then placed in a solution of a light brine which will be used to simulate a formation brine. The light brine can be made of potassium chloride, sodium chloride, calcium chloride, magnesium chloride, or a combination of these or any salt which would be determined from an analysis of actual formation water. The core is vacuum saturated in the brine. The core is then placed in a core holder. The core and core holder is then placed in a core test apparatus such as a Hassler Core Test Cell. This apparatus allows pressure to be applied in a radial and an axial direction. The top and bottom of the core are exposed to the flow of the brine.

The brine is then flowed through the core by using a pump or a pressure drive system. The Rate of flow (Q) in units/time and the pressure (P) in psi are recorded. The permeability of the core is then calculated using Darcy's equation:

$$K = \frac{\mu Q A}{\Delta P L}$$

where $\mu$ is the viscosity measured in centipoises and K is a constant.

The direction of the initial flow of the brine through the core is the production direction. The direction of flow is reversed to simulate injection of a fluid into a well. This is termed "injection direction."

For this test, a crosslinked guar gel without internal breakers is used to obtain a filter cake. The obtained filter cake has about ten to twenty-five times the viscosity of a conventional crosslinked gel. The gel can be prepared in any manner normally used in well bore operations. The crosslinked gel components are listed in Table I.

The crosslinked gel is injected at 1000 psi and the flow and amount of effluent is recorded as described in the procedure outlined in API Publication RP 39. This injection can be maintained for any given length of time.

The direction of flow is then reversed to the production direction and the flow is again measured. The permeability is calculated again using Darcy's equation. The two values are used to calculate percent damage.

The flow is reversed to the injection direction and an enzyme treatment at 90,000 IU/g is injected. The enzyme treatment is a 1:2 (w/w) solution of (1,6)-α-D-galactosidase and mannan endo(1,4)-β-D-mannosidase. One IU (international unit) equals the amount of enzyme that hydrolyzes 1 μmole of substrate (guar) per minute at 25° C. under optimal conditions of measurement. The enzyme fluid was shut in for a given time period.

The permeability is then measured in the production direction and a final permeability is calculated. The percent damage is calculated using the initial and final permeability. Any additional treatment is done in the manner of the preceding paragraph. The results are shown in the following Table:

TABLE I

| | Damage Permeability Test | | |
|---|---|---|---|
| TEMP °F. | TIME | EFFECT ON FILTER CAKE | PERMEABILITY |
| 150 | 0 MINUTES | INTACT | 0 |
| 150 | 30 MINUTES | UNDISSOLVED RESIDUE | 0 |
| 150 | 45 MINUTES | INCOMPLETE DISSOLUTION | 50% |
| 150 | 1 HOUR | COMPLETE DISSOLUTION | 97 + % |

Crosslinked Gel Components

2% KCl, 30 pounds per thousand (ppt) guar, 3.0 gallons per thousand (gpt) 45% potassium carbonate, 1.25 gpt borate crosslinking agent

Enzyme Treatment Components

2% KCl, gpt 90,000 IU/ml galactomannanase, 4 ppt fumaric acid, 5 gpt surfactants, 5 gpt foaming agents pH: 3.80

The filter cake concentration is equivalent to 480 ppt of guar.

EXAMPLE 2

The testing procedure for retained conductivity follows a standard protocol used in the petroleum industry as described in SPE 19402. First, a borate/guar crosslinked fracture fluid of the composition described in Table I was placed in the proppant pack without an internal breaker at a pH of 9.97. Next, a filter cake was formed by placing the proppant pack under a closure stress of 2000 psi at 150° F. and shut in for eight hours. The proppant pack damage (damage caused by the filter cake and the unbroken gel) was calculated at about 92%, with 8% retained permeability.

Then the proppant pack was treated with two pore volumes of the enzyme treatment described in Table I. The enzyme treatment was shut in for two hours at a 2,000 psi closure stress at 150° F. and a pH of 3.80. After two hours of treatment, the final retained permeability reached 82%.

The present invention has several advantages. The invention allows increased permeability of a formation plugged by a polysaccharide-containing filter cake or a viscous fluid. The enzyme treatment of the invention is active at low to moderate temperatures commonly found in subterranean foundations.

Another advantage is that the enzymes do not have to be completely removed or inactivated before using another gel in the formation. For example, after removing a guar-containing filter cake, the formation can be treated with a cellulose-containing gel. Unlike the treatments that rely on oxidants, the enzymes that degrade a guar-containing filter cake can only attack polymers with mannosidic and galactomannosidic linkages. The enzymes cannot attack the cellulose in the gel because the gel has neither linkage. Since the enzymes are specific for linkages commonly found in guars and celluloses, they do not react with or degrade other materials, such as metals, tubings, resins, reservoir, reservoir fluids and the like.

A third advantage is the enzymes can be used in more types of formations. Because the enzymes do not react with metals, they can be used in formations where oxidizing agents react. For example, the enzyme treatment can be used in formations with calcium or iron deposits without reacting to form damaging precipitates.

While the invention is shown in only one of its forms, it is not thus limited but is susceptible to various changes and modifications without departing from the invention's spirit.

What is claimed is:

1. A method of increasing the flow of production fluids from a subterranean formation by removing a polysaccharide-containing filter cake formed during production operations and found within the subterranean formation which surrounds a completed well bore comprising the steps of:
    allowing production fluids to flow from the well bore;
    reducing the flow of production fluids from the formation below expected flow rates;
    formulating an enzyme treatment by blending together an aqueous fluid and enzymes;
    pumping the enzyme treatment to a desired location within the well bore; and
    allowing the enzyme treatment to degrade the polysaccharide-containing filter cake, whereby the filter cake can be removed from the subterranean formation to the well surface.

2. A method of increasing the flow of production fluids from a subterranean formation by removing a polysaccharide-containing filter cake formed during production operations and found within the subterranean formation which surrounds a completed well bore comprising the steps of:
    allowing production fluids to flow from the well bore;
    reducing the flow of production fluids from the formation below expected flow rates;
    formulating an enzyme treatment by blending together an aqueous fluid and enzymes;
    pumping the enzyme treatment to a desired location within the well bore;
    allowing the enzyme treatment to degrade the polysaccharide-containing filter cake, whereby the filter cake can be removed from the subterranean formation to the well surface; and
    wherein the enzyme treatment has activity in the pH range of about 2.0 to 10.0 and effective to attack only specific linkages in the polysaccharide-containing filter cake.

3. The method of claim 2, wherein the polysaccharide containing filter cake is selected from the group consisting of guar, derivatized guars, cellulose, derivatized celluloses, starches, derivatized starches xanthans and derivatized xanthans.

4. The method of claim 2, wherein the enzymes are hydrolases.

5. The method of claim 2, wherein the enzyme treatment has activity at low to moderate temperatures between about 50° F. to 230° F.

6. A method of increasing the flow of production fluids from a subterranean formation by removing a guar-containing filter cake formed during production operations and found within the subterranean formation which surrounds a completed well bore comprising the steps of:
    allowing production fluids to flow from the well bore;
    reducing the flow of production fluids from the formation below expected flow rates;
    formulating an enzyme treatment by blending together an aqueous fluid and enzymes;
    pumping the enzyme treatment to a desired location within the well bore;
    allowing the enzyme treatment to degrade the guar-containing filter cake having repeating units of mannose and galactose linked by mannosidic and galactomannosidic linkages, whereby the filter cake can be removed from the subterranean formation to the well surface; and
    wherein the enzyme treatment has activity in the pH range of about 2.0 to 10.0 and effective to attack only specific linkages within the guar-containing filter cake.

7. The method of claim 6, wherein the enzyme treatment is specific to attach the mannosidic and galactomannosidic linkages of the guar-containing filter cake to reduce the filter cake to a solution of principally monosaccharide units.

8. A method of increasing the flow of production fluids from a subterranean formation by removing a guar-containing filter cake formed during production operations and found within the subterranean formation which surrounds a completed well bore comprising the steps of:
    allowing production fluids to flow from the well bore;
    reducing the flow of production fluids from the formation below expected flow rates;
    formulating an enzyme treatment by blending together an aqueous fluid and enzymes;
    pumping the enzyme treatment to a desired location within the well bore;
    allowing the enzyme treatment to degrade the guar-containing filter cake having repeating units of mannose and galactose linked by $(1,4)$-$\beta$-D-mannosidic and $(1,6)$-$\alpha$-D-galactomannosidic linkages, whereby the filter cake can be removed from the subterranean formation to the well surface; and
    wherein the enzyme treatment is effective to attack the $(1,4)$-$\beta$-D-mannosidic and $(1,6)$-$\alpha$-D-galactomannosidic linkages.

9. The method of claim 8, wherein the enzyme treatment is a 1:2 solution of $\alpha$-D-galactosidase and mannan endo-$(1,4)$-$\beta$-mannosidase.

10. A method of increasing the flow of production fluids from a subterranean formation by removing a cellulose-containing filter cake formed during production operations and found within the subterranean formation which surrounds a completed well bore comprising the steps of:
    allowing production fluids to flow from the well bore;
    reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the cellulose-containing filter cake having repeating units of glucose linked by glucosidic linkages, whereby the filter cake can be removed from the subterranean formation to the well surface; and wherein the enzyme treatment has activity in the pH range of about 2.0 to 8.0 and effective to attack only specific linkages within the polysaccharide-containing filter cake.

11. The method of claim 10, wherein the enzyme treatment is specific to attack the glucosidic linkages of the cellulose-containing filter cake to reduce the filter cake to a solution of smaller molecules.

12. The method of claim 11 wherein the enzyme treatment is specific to attack the glucosidic linkages of the cellulose-containing filter cake to reduce the filter cake to a solution of principally monosaccharide and disaccharide units.

13. A method of increasing the flow of production fluids from a subterranean formation by removing a cellulose-containing filter cake formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and an enzyme;

pumping the enzyme treatment to a desired location within the well bore;

allowing the enzyme treatment to degrade the cellulose-containing filter cake having repeating units of glucose linked by (1,4)-$\beta$-D-glucosidic linkages, whereby the filter cake can be removed from the subterranean formation to the well surface; and wherein the enzyme treatment is effective to attack the (1,4)-$\beta$-D-glucosidic linkages.

14. The method of claim 13, wherein the enzymes of the treatment are selected from the group consisting of cellulase, nonspecific hemicellulases, glucosidases, endo-xylanases, exo-xylanases and combinations thereof.

15. The method of claim 14, wherein the enzyme treatment is a 1:4 solution of exo(1,4)-$\beta$-D-xylanase and endo(1,4)-$\beta$-D-xylanase 16. A method of increasing the flow of production fluids from a subterranean formation by removing a noncrosslinked, viscous, polysaccharide-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore; and allowing the enzyme treatment to degrade the noncrosslinked, viscous, polysaccharide-containing, damaging fluid, whereby the fluid can be removed from the subterranean formation to the well surface.

17. A method of increasing the flow of production fluids from a subterranean formation by removing a noncrosslinked, viscous, polysaccharide-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the noncrosslinked, viscous, polysaccharide-containing, damaging fluid, whereby the fluid can be removed from the subterranean formation to the well surface; and wherein the enzyme treatment has activity in the pH range of about 2.0 to 10.0 and effective to attack only specific linkages in the polysaccharide-containing, damaging fluid.

18. The method of claim 17, wherein the polysaccharide-containing, damaging fluid is selected from the group consisting of celluloses, derivatized celluloses, starches, derivatized starches, xanthans and derivatized xanthans.

19. The method of claim 17, wherein the enzymes are hydrolases.

20. The method of claim 17, wherein the enzyme treatment has activity at low to moderate temperatures between about 50° F. and 230° F.

21. A method of increasing the flow of production fluids from a subterranean formation by removing a viscous, starch-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the viscous, starch-containing, damaging fluid, having repeating units linked by $\alpha$-glucosidic linkages, whereby the fluid can be removed from the subterranean formation to the well surface; and wherein the enzyme treatment is effective to attack the $\alpha$-glucosidic linkages in the starch-containing fluid.

22. The method of claim 21, wherein the enzyme is selected from the group consisting of end-amylases, exo-amylases, isoamylases, glucosidases, amylo-glucosidases, malto-hydrolases, maltosidases, isomalto-hydrolases, malto-hexaosidases, and any combination thereof.

23. The method of claim 22, wherein the enzyme treatment attacks the internal (1,4)-$\alpha$-D-glucosidic linkages of the starch-containing fluid to reduce the starch into a solution devoid of starch when measured by iodine testing.

24. A method of increasing the flow of production fluids from a subterranean formation by removing a noncrosslinked, viscous, starch-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the noncrosslinked, viscous, starch-containing, damaging fluid, having subunits of amylose with repeating units of glucose linked by (1,4)-$\alpha$-D-glucoidic linkages and amylopectin with a backbone of (1,4)-$\alpha$-D-glucosidic linkages and side chains of glucose linked to the backbone by (1,6)-$\alpha$-D-glucosidic linkages, whereby the fluid can be removed from the subterranean formation to the well surface; and wherein the enzyme treatment is to attack the internal (1,4)-$\alpha$-D-glucosidic linkages in the starch-containing, damaging fluid.

25. The method of claim 24, wherein the enzyme treatment is an endo-amylase.

26. A method of increasing the flow of production fluids from a subterranean formation by removing a noncrosslinked, viscous, cellulose-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the noncrosslinked, viscous, cellulose-containing, damaging fluid having a backbone of repeating units of glucose linked by $\beta$-glucosidic linkages, whereby the fluid can be removed from the subterranean formation to the well surface; and wherein the enzyme treatment has activity in the pH range of about 2.0 to 10.0, a temperature range between about 50° F. and 150° F. and is effective to attack only specific linkages in the cellulose-containing, damaging fluid.

27. The method of claim 26, wherein the cellulose-containing, damaging fluid is selected from the group of cellulose, derivatized cellulose, xanthan and deriviatized xanthan.

28. The method of claim 27, wherein the enzyme treatment is specific to attack the $\beta$-glucosidic linkages of the cellulose backbone.

29. A method of increasing the flow of production fluids from a subterranean formation by removing a noncrosslinked, viscous, cellulose-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and an enzyme;

pumping the enzyme treatment to a desired location within the well bore;

allowing the enzyme treatment to degrade the noncrosslinked, viscous, cellulose-containing, damaging fluid having repeating units of glucose linked by (1,4)-$\beta$-D-glucosidic linkages in the backbone, whereby the fluid can be removed from the subterranean formation to the well surface; and wherein the enzyme treatment is effective to attack the (1,4)-$\beta$-D-glucosidic linkages.

30. The method of claim 29, wherein the enzymes of the treatment are selected from the group consisting of cellulase, nonspecific hemicellulases, glucosidases, endo-xylanases, exo-xylanases, mannosidases and combinations thereof.

31. The method of claim 30, wherein the enzyme treatment is a solution selected from the group consisting of exo(1,4)-$\beta$-D-xylanase, endo(1,4)-$\beta$-D-xyanase, mannan (1,2)-$\beta$-D-mannosidase and combinations thereof.

32. A method of increasing the flow of production fluids from a subterranean formation by removing a noncrosslinked, viscous, xanthan-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the noncrosslinked, viscous, xanthan-containing, damaging fluid having a backbone of repeating units of glucose linked by $\beta$-glucosidic linkages and trisaccharide side chains, whereby the fluid can be removed from the subterranean formation to the well surface; and wherein the enzyme treatment has activity in the pH range of about 2.0 to 10.0, a temperature range between about 50° F. and 150° F. and is effective to attack only specific linkages in the xanthan-containing, damaging fluid.

33. A method of increasing the flow of production fluids from a subterranean formation by removing a noncrosslinked, viscous, xanthan-containing, damaging fluid formed during production operations and found within the subterranean formation which surrounds a completed well bore comprising the steps of:

allowing production fluids to flow from the well bore;

reducing the flow of production fluids from the formation below expected flow rates;

formulating an enzyme treatment by blending together an aqueous fluid and enzymes;

pumping the enzyme treatment to a desired location within the well bore;

allowing the enzyme treatment to degrade the noncrosslinked, viscous, xanthan-containing, damaging fluid having a backbone of repeating units of glucose linked by (1,4)-$\beta$-D-glucosidic linkages and trisaccharide side chains with (1,2)-β-D-mannosidic linkages and attached to alternating glucose molecules in the backbone, whereby the fluid can be removed from the subterranean formation to the well surface; and wherein the enzyme treatment is effective to attack only specific linkages in the xanthan-containing, damaging fluid.

34. The method of claim 33, wherein the enzyme treatment is a solution selected from the group consisting of cellulase, exo(1,4)-β-D-xylanase, endo(1,4)-β-D-xylanase, mannosidases, and combinations thereof.

35. The method of claim 34, wherein the enzyme treatment is a solution of exo(1,4)-β-D-xylanase, endo(1,4)-β-D-xylanase and (1,2)-β-D-mannosidase.

* * * * *